(12) United States Patent
Orlando et al.

(10) Patent No.: US 7,832,193 B2
(45) Date of Patent: Nov. 16, 2010

(54) GAS TURBINE ENGINE ASSEMBLY AND METHODS OF ASSEMBLING SAME

(75) Inventors: Robert Joseph Orlando, West Chester, OH (US); Thomas Ory Moniz, Loveland, OH (US); Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 832 days.

(21) Appl. No.: 11/553,571

(22) Filed: Oct. 27, 2006

(65) Prior Publication Data

US 2008/0098713 A1    May 1, 2008

(51) Int. Cl.
*F02K 3/02* (2006.01)
(52) U.S. Cl. .................. 60/268; 60/226.1; 415/61
(58) Field of Classification Search .......... 60/268, 60/226.1, 39.162; 415/9, 174.4; 416/2
See application file for complete search history.

(56) References Cited

U.S. PATENT DOCUMENTS

| | | | | |
|---|---|---|---|---|
| 4,751,816 A | * | 6/1988 | Perry | 60/226.1 |
| 4,827,712 A | * | 5/1989 | Coplin | 60/226.1 |
| 4,916,894 A | * | 4/1990 | Adamson et al. | 60/226.1 |
| 4,969,325 A | * | 11/1990 | Adamson et al. | 60/226.1 |
| 5,274,999 A | | 1/1994 | Rohra et al. | |
| 6,158,210 A | * | 12/2000 | Orlando | 60/226.1 |
| 6,339,927 B1 | | 1/2002 | DiPietro, Jr. | |
| 6,711,887 B2 | | 3/2004 | Orlando et al. | |
| 6,732,502 B2 | | 5/2004 | Seda et al. | |
| 6,739,120 B2 | | 5/2004 | Moniz et al. | |
| 6,763,652 B2 | | 7/2004 | Baughman et al. | |
| 6,763,653 B2 | | 7/2004 | Orlando | |
| 6,763,654 B2 | | 7/2004 | Orlando | |
| 7,140,174 B2 | | 11/2006 | Johnson | |
| 7,186,073 B2 | | 3/2007 | Orlando et al. | |
| 7,490,460 B2 | * | 2/2009 | Moniz et al. | 60/268 |
| 7,490,461 B2 | * | 2/2009 | Moniz et al. | 60/268 |
| 7,493,753 B2 | * | 2/2009 | Moniz et al. | 60/268 |
| 7,493,754 B2 | * | 2/2009 | Moniz et al. | 60/268 |
| 7,513,103 B2 | * | 4/2009 | Orlando et al. | 60/268 |
| 7,526,913 B2 | * | 5/2009 | Orlando et al. | 60/268 |
| 2007/0084183 A1 | * | 4/2007 | Moniz et al. | 60/204 |
| 2007/0084186 A1 | * | 4/2007 | Orlando et al. | 60/204 |

* cited by examiner

*Primary Examiner*—William H Rodríguez
(74) *Attorney, Agent, or Firm*—Marcella R. Louke; General Electric Company

(57) ABSTRACT

A method of assembling a gas turbine assembly includes providing a core gas turbine engine including a high-pressure compressor, a combustor, and a turbine, coupling a low-pressure turbine to the core gas turbine engine, coupling a booster compressor to a gearbox, and coupling the gearbox to the low-pressure turbine such that the booster compressor is driven by the low-pressure turbine.

12 Claims, 3 Drawing Sheets

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a fan assembly, a core engine, and a low-pressure or power turbine. The core engine includes at least one compressor, a combustor, and a high-pressure turbine that are coupled together in a serial flow relationship. Air entering the core engine is mixed with fuel and ignited to form a high energy gas stream. The high energy gas stream flows through the high-pressure turbine to rotatably drive the high-pressure turbine and thus the compressor via a first drive shaft. The gas stream further expands through the low-pressure turbine, which rotatably drives the fan assembly through a second drive shaft.

To improve engine efficiency, it is desirable to operate the fan assembly at a relatively lower speed than the operating speed of the high-pressure turbine. However, operating the fan at a relatively slow speed may be detrimental to the operation of a booster compressor. As such, additional booster stages may be required in order to produce the desired overall pressure ratio, thus increasing the overall cost, design complexity, and weight of the gas turbine engine.

BRIEF DESCRIPTION OF THE INVENTION

In one aspect, a method of assembling a gas turbine engine is provided. The method includes coupling a low-pressure turbine to the core gas turbine engine, coupling a booster compressor to a gearbox, and coupling the gearbox to the low-pressure turbine such that the booster compressor is driven by the low-pressure turbine.

In another aspect, a turbine engine assembly is provided. The turbine engine assembly includes a core gas turbine engine including a high-pressure compressor, a combustor, and a turbine. The turbine engine assembly also includes a low-pressure turbine coupled to the core gas turbine engine, a booster compressor, and a gearbox coupled between the low-pressure turbine and the booster compressor such that the booster compressor is driven by the low-pressure turbine.

DETAILED DESCRIPTION OF THE INVENTION

Figure 1:
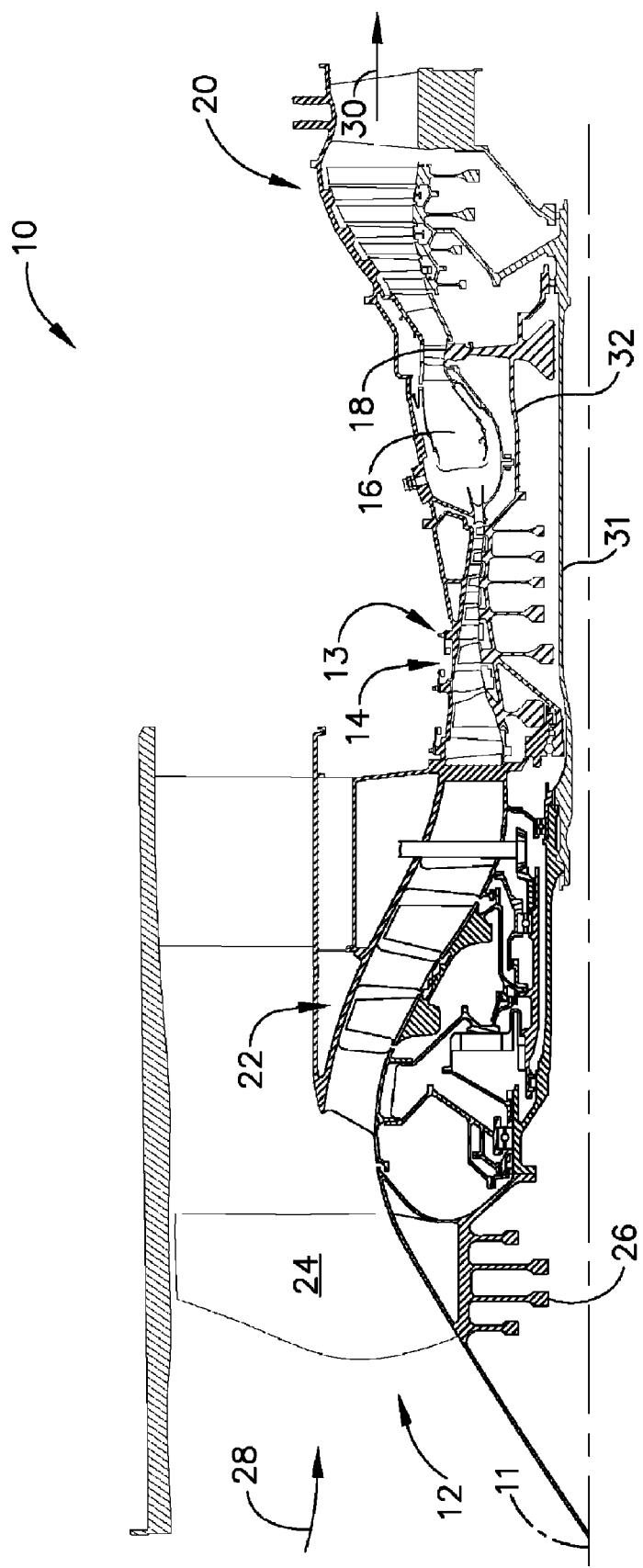
FIG. 1 is a cross-sectional view of a portion of an exemplary gas turbine engine assembly that includes a gear-driven booster.

FIG. 1 is a schematic illustration of an exemplary gas turbine engine assembly 10 having a longitudinal axis 11. Gas turbine engine assembly 10 includes a fan assembly 12, and a core gas turbine engine 13 that includes a high-pressure compressor 14, a combustor 16, and a high-pressure turbine 18. In the exemplary embodiment, gas turbine engine assembly 10 also includes a low-pressure turbine 20 and a multi-stage booster compressor 22.

Fan assembly 12 includes an array of fan blades 24 extending radially outward from a rotor disk 26. Gas turbine engine assembly 10 has an intake side 28 and an exhaust side 30. Fan assembly 12 and low-pressure turbine 20 are coupled together via a gearbox 100 driven by a first rotor shaft 31, and compressor 14 and high-pressure turbine 18 are coupled together by a second rotor shaft 32.

Figure 2:
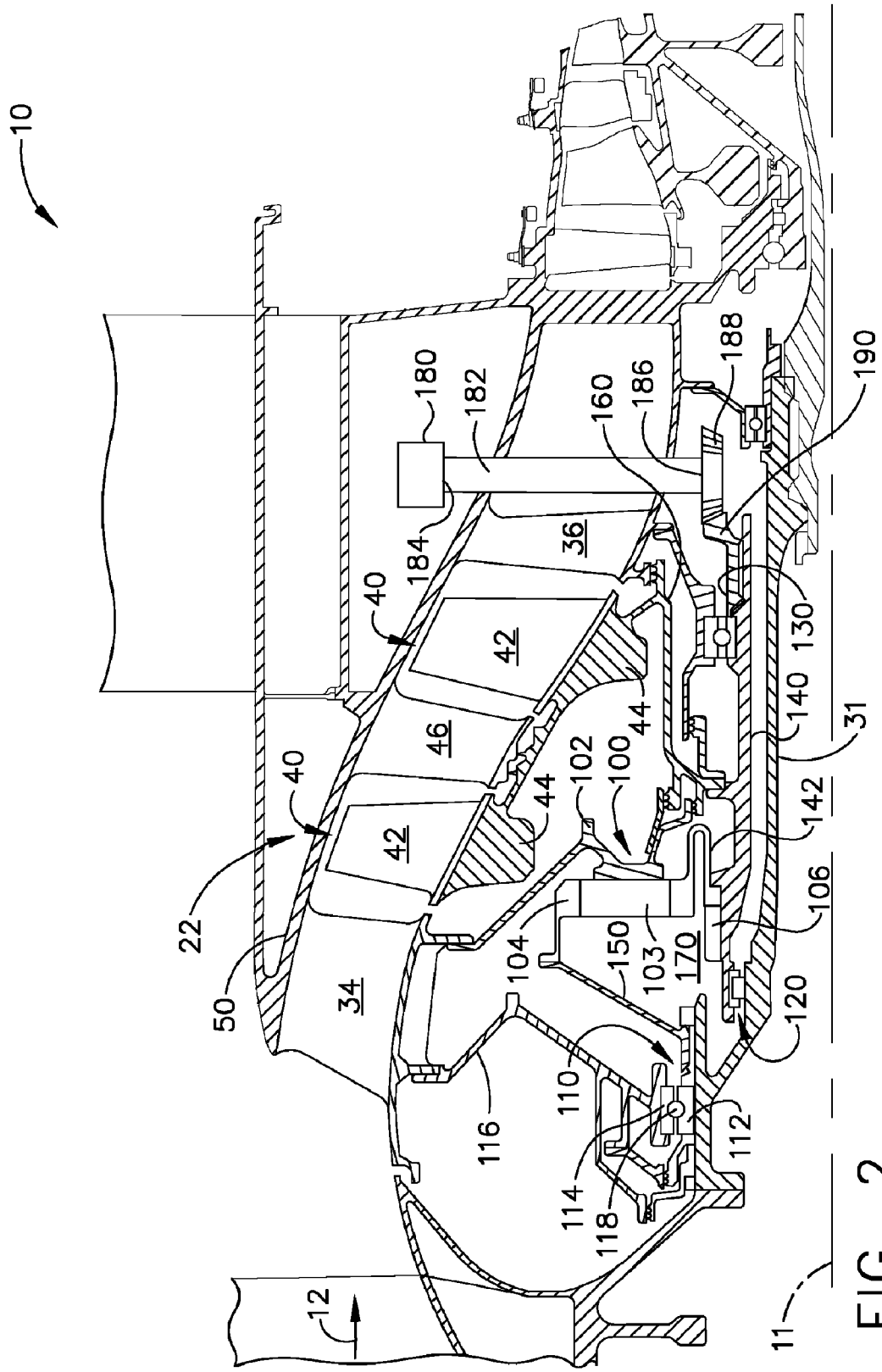
FIG. 2 is an enlarged cross-sectional view of a portion of the turbine engine assembly shown in FIG. 1.

FIG. 2 is an enlarged cross-sectional view of a portion of the turbine engine assembly shown in FIG. 1. As shown in FIG. 2, booster 22 includes a plurality of circumferentially-spaced structural vanes 34 that function as inlet guide vanes (IGV) to facilitate channeling airflow entering gas turbine engine assembly 10 downstream through booster 22. In the exemplary embodiment, booster 22 also includes a plurality of outlet guide vane (OGV) assemblies 36. Moreover, in the exemplary embodiment booster 22 includes two stages 40, wherein each stage includes a rotor section and a disk section. Specifically, each rotor section includes a plurality of rotor blades 42 that are each coupled to a respective rotor disk 44. Booster compressor 22 is positioned downstream from inlet guide vane assembly 34 and upstream from core gas turbine engine 13. Although booster compressor 22 is shown as having only two rows of rotor blades 42, it should be realized that booster compressor 22 may have a single row of rotor blades 42, or three or more rows of rotor blades 42 that are interdigitated with a plurality of rows of guide vanes 46. In one embodiment, inlet guide vanes 34 are fixedly coupled to a booster case 50. In another embodiment, inlet guide vanes 34 are movable during engine operation to facilitate varying a quantity of air channeled through booster compressor 22.

In the exemplary embodiment, booster compressor 22 is rotatably coupled to a gearbox 100 such that booster compressor 22 rotates at a rotational speed that is different than a rotational speed of fan assembly 12 and low-pressure turbine 20. Specifically, gearbox 100 is coupled between shaft 31 and booster compressor 22 to facilitate rotating booster compressor in either the same or an opposite direction than fan assembly 12.

In the exemplary embodiment, gearbox assembly 100 has a gear ratio of approximately 2 to 1 such that fan assembly 12 rotates at a rotational speed that is approximately one-half the rotational speed of booster 22. Accordingly, in the exemplary embodiment, booster compressor 22 rotates at a rotational speed that is faster than the rotational speed of fan assembly 12. In the exemplary embodiment, gearbox 100 is an epicyclic gearbox that substantially circumscribes shaft 31 and includes a support structure 102, at least one gear 103 coupled within support structure 102, an input 104 gear, and an output gear 106.

More specifically, gearbox 100 is supported by, and maintained in a substantially fixed orientation within gas turbine engine assembly 10, utilizing support structure 102 which is coupled to structural vanes 34. Gas turbine engine assembly 10 also includes a fan thrust bearing assembly 110 that is configured to support fan assembly 12. Fan thrust bearing assembly 110 is coupled between structural vanes 34 and shaft 31 such that the residual thrust generated by fan assembly 12 and low-pressure turbine 20 is transmitted to structure 34. More specifically, and in the exemplary embodiment, fan bearing assembly 110 includes a rotating inner race 112 and a stationary outer race 114 that is coupled to bearing housing 116. As such, fan bearing assembly 110 includes a plurality of rolling elements 118 that are disposed between races 112 and 114, respectively.

Gas turbine engine assembly 10 also includes a second bearing assembly 120 and a third fan bearing assembly 130. Specifically, second and third bearing assemblies 120 and 130 are coupled radially outwardly from a drive shaft extension 140 that is coupled to gearbox 100 via a flex connection 142. In the exemplary embodiment, second bearing assembly 120 is a roller bearing that is utilized to provide radial support for drive shaft extension 140, and thus gearbox 100. Bearing assembly 130 is a thrust bearing that is utilized to provide axial support for drive shaft extension 140, and also to absorb thrust generated by booster 22.

Moreover, and in the exemplary embodiment, gas turbine engine assembly 10 may also include a generator 180, a generator drive shaft 182 that includes a first end 184 that is coupled to generator 180, a second end 186, and a bevel gear 188 that is coupled to drive shaft second end 186. To operate generator 180, shaft 140 includes a bevel gear 190 that is splined to a downstream end of shaft 140 that is configured to mesh with bevel gear 188. As such, generator 180 may provide additional electrical energy to peak demand periods during normal engine operation and during idle speeds, for example. More specifically, during operation, power generated by booster compressor 22 is utilized to drive shaft 140. Since shaft 140 is coupled to generator drive shaft 182 utilizing bevel gears 188 and 190, work is extracted from booster compressor 22 to drive generator 180. As a result, additional energy is extracted from the booster compressor to drive the generator 180 to support ever increasing electrical demands. Specifically, newer aircraft are designed to require an atypically large amount of electrical power. As a result, generator 180 may be utilized to meet the ever increasing electrical demands of newer aircraft.

During assembly, input gear 104 is splined to shaft 31 utilizing a cone or disk 150 such that the rotational force generated by low-pressure turbine 20 through shaft 31 is transmitted to gearbox 100 and also to fan assembly 12. Output gear 106 is splined to drive shaft extension 140 via flex connection 142 such that the rotational force is transmitted from gearbox 100 to drive shaft extension 140. As shown in FIG. 2, booster rotor disk 44 is coupled to an aft end of drive shaft extension 140 utilizing a shaft 160.

During operation, core gas turbine engine 13 causes low-pressure turbine 20 to rotate and thus causes shaft 31 to rotate. Since shaft 31 is coupled to gearbox 100 via drive shaft extension 140, torque developed by low-pressure turbine 20 is provided to both fan assembly 12 and gearbox 100. The torque transferred by gearbox 100 is then utilized to drive booster 22. In the exemplary embodiment, gearbox 100 is located within a sump 170. During operation, gearbox 100 is continuously lubricated.

Figure 3:
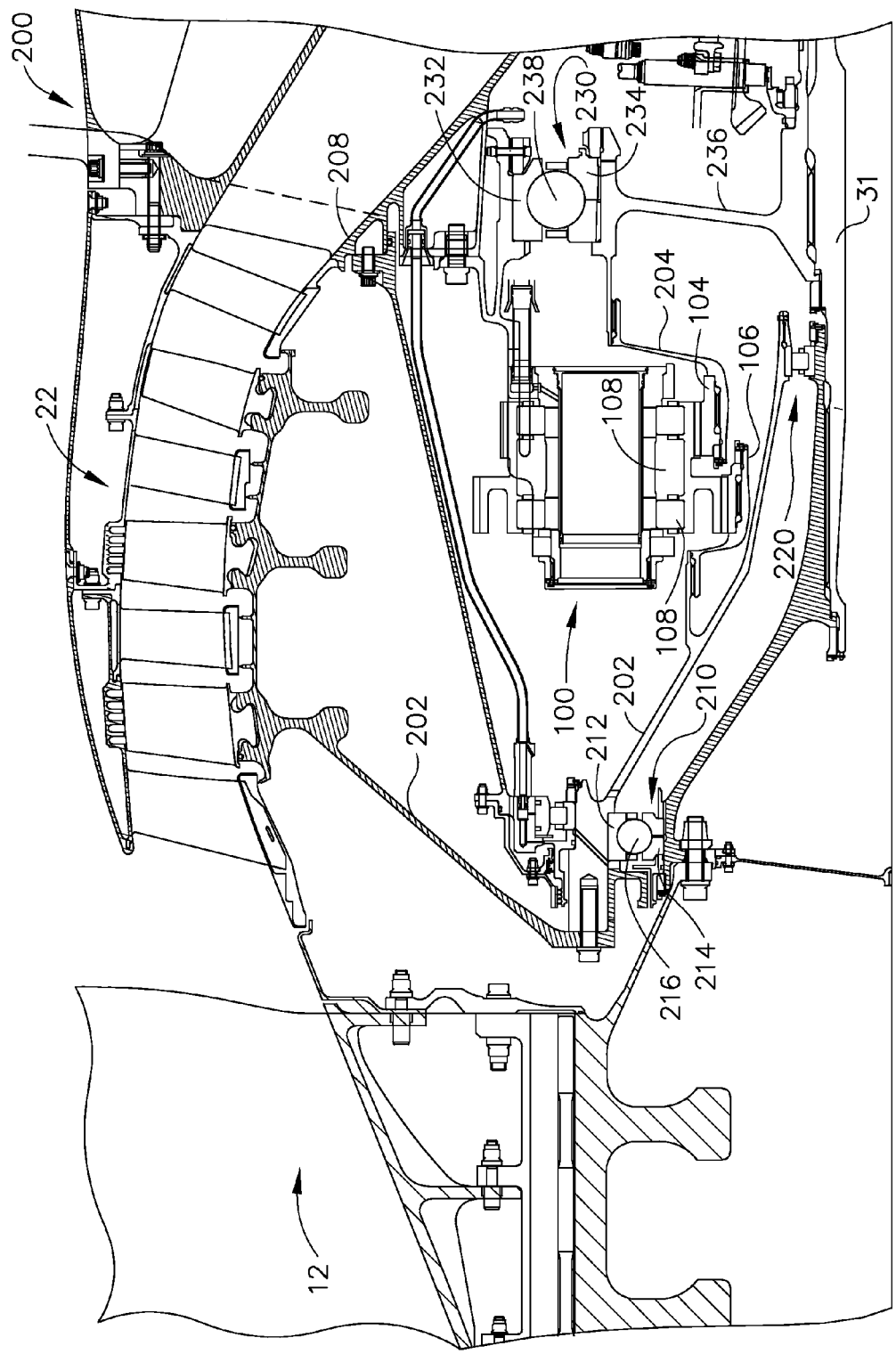
FIG. 3 is a cross-sectional view of a portion of another exemplary gas turbine engine assembly that includes a gear-driven booster.

FIG. 3 is a cross-sectional view of a portion of another exemplary gas turbine engine assembly 200 that includes a gear driven booster 22. As discussed above, gearbox 100 includes an input gear 104 and an output gear 106, and a plurality of gears 108. In this embodiment, booster 22 is coupled to output gear 106 utilizing a disk 202, and shaft 31 is coupled to input gear 104 utilizing an extension apparatus 204.

More specifically, gas turbine engine assembly 200 includes a bearing 210 that is coupled between disk 202 and shaft 31. In the exemplary embodiment, bearing assembly 210 is a thrust bearing that acts as a differential bearing assembly in combination with a bearing assembly 220 to support booster 22 and fan assembly 12 and/or transfer thrust loads and/or forces from booster compressor 22 to a frame 208. In one embodiment, bearing assembly 210 includes a radially outer race 212 that is mounted to cone 202, and a radially inner race 214 that is mounted with respect to shaft 31. Bearing assembly 210 also includes a plurality of rolling elements 216 that are mounted between outer and inner races 212 and 214. As shown in FIG. 3, gas turbine engine assembly 200 also includes a bearing assembly 230. In the exemplary embodiment, bearing assembly 230 is a thrust bearing assembly that is utilized to transfer the residual thrust generated by fan assembly 12, low-pressure turbine 20, and booster 22 to a frame 208. In one embodiment, bearing assembly 230 includes a radially outer race 232 that is mounted to frame 208 and to gearbox 100 such that both gearbox 100 and outer race 232 are maintained in a substantially fixed position within gas turbine engine assembly 200. Bearing assembly 230 also includes a radially inner race 234 that is coupled to shaft 31 utilizing a shaft extension 236. Bearing assembly 230 also includes a plurality of rolling elements 238 that are mounted between outer and inner races 232 and 234. In this embodiment, gas turbine engine assembly includes a three stage booster compressor 22.

The gas turbine engine assemblies described herein each include a low-pressure turbine that is configured to drive both the fan assembly and the booster compressor. Specifically, the turbine engine assemblies described herein each include a smaller, high speed, higher pressure ratio, booster that is driven by the low-pressure turbine utilizing a gearbox. In the exemplary embodiment, the gearbox has a ratio of between approximately 1.5 to 1 and approximately 2.4 to 1. Moreover, the booster compressor is coupled to the low-pressure turbine via a flex connection to facilitate smoothly transferring torque generated by the low-pressure turbine to the gearbox. As such, the geared booster enables a smaller core gas turbine engine to be utilized with reduced stage count.

Exemplary embodiments of a gas turbine engine assembly that includes a gearbox coupled to a fan assembly are described above in detail. The components are not limited to the specific embodiments described herein, but rather, components of each system may be utilized independently and separately from other components described herein. The gearbox driven booster compressor described herein can also be used in combination with other known gas turbine engines.

While the invention has been described in terms of various specific embodiments, those skilled in the art will recognize that the invention can be practiced with modification within the spirit and scope of the claims.

What is claimed is:

1. A method of assembling a gas turbine assembly, said method comprising:

providing a core gas turbine engine including a high-pressure compressor, a combustor, and a turbine;

coupling a low pressure turbine to the core gas turbine engine;

coupling a booster compressor to a gearbox;

coupling the gearbox to the low-pressure turbine such that the booster compressor is driven by the low-pressure turbine;

coupling a drive shaft to the low pressure turbine; and coupling the gearbox between the drive shaft and the booster compressor such that the booster compressor rotates at a rotational speed that is different than the rotational speed of the low-pressure turbine.

2. A method of assembling a gas turbine assembly, said method comprising:

providing a core gas turbine engine including a high-pressure compressor, a combustor, and a turbine;

coupling a low pressure turbine to the core gas turbine engine;

coupling a booster compressor to a gearbox;

coupling the gearbox to the low-pressure turbine such that the booster compressor is driven by the low-pressure turbine;

coupling a drive shaft to the low pressure turbine;

coupling a fan assembly to the drive shaft such that the fan assembly rotates at a rotational speed that is the same as the rotational speed of the low-pressure turbine; and coupling a thrust bearing assembly between the fan assembly and the low-pressure turbine such that the residual thrust generated by the fan assembly and the low-pressure turbine is transmitted to a stationary structural component.

3. A method of assembling a gas turbine assembly, said method comprising:
provide a core gas turbine engine including a high-pressure compressor, a combustor, and a turbine;
coupling a low pressure turbine to the core gas turbine engine;
coupling a booster compressor to a gearbox;
coupling the gearbox to the low-pressure turbine such that the booster compressor is driven by the low-pressure turbine;
coupling a drive shaft to the low pressure turbine; and
coupling a thrust bearing assembly between the booster compressor and the gearbox such that the residual thrust loads generated by the booster compressor are transferred to a stationary structural component.

4. A method of assembling a gas turbine assembly, said method comprising:
providing a core gas turbine engine including a high-pressure compressor, a combustor, and a turbine;
coupling a low pressure turbine to the core gas turbine engine;
coupling a booster compressor to a gearbox; and
coupling the gearbox to the low-pressure turbine such that the booster compressor is driven by the low-pressure turbine;
wherein coupling said gearbox further comprises coupling a gearbox having a substantially toroidal cross-sectional profile between the booster compressor and the drive shaft such that the gearbox substantially circumscribes the drive shaft.

5. A method of assembling a gas turbine assembly, said method comprising:
providing a core gas turbine engine including a high-pressure compressor, a combustor, and a turbine;
coupling a low pressure turbine to the core gas turbine engine;
coupling a booster compressor to a gearbox;
coupling the gearbox to the low-pressure turbine such that the booster compressor is driven by the low-pressure turbine; and
coupling a flex connection between the drive shaft and gearbox.

6. A turbine engine assembly comprising:
a core gas turbine engine including a high-pressure compressor, a combustor, and a high-pressure turbine;
a low-pressure turbine coupled to said core gas turbine engine;
a booster compressor;
a gearbox coupled between said low-pressure turbine and said booster compressor such that the booster compressor is driven by the low-pressure turbine; and
a drive shaft coupled between said low-pressure turbine and said gearbox to facilitate driving said booster compressor at a rotational speed that is different than the rotational speed of the low-pressure turbine.

7. A turbine engine assembly comprising:
a core gas turbine engine including a high-pressure compressor, a combustor, and a high-pressure turbine;
a low-pressure turbine coupled to said core gas turbine engine;
a booster compressor;
a gearbox coupled between said low-pressure turbine and said booster compressor such that the booster compressor is driven by the low-pressure turbine;
a drive shaft coupled to said low-pressure turbine;
a fan assembly coupled to said drive shaft such that said fan assembly rotates at a rotational speed that is the same as the rotational speed of the low pressure turbine; and
a thrust bearing assembly coupled between the fan assembly and said low-pressure turbine and configured to transfer residual thrust loads generated by said fan assembly and said low-pressure turbine to a stationary structural component.

8. A turbine engine assembly comprising:
a core gas turbine engine including a high-pressure compressor, a combustor, and a high-pressure turbine;
a low-pressure turbine coupled to said core gas turbine engine;
a booster compressor;
a gearbox coupled between said low-pressure turbine and said booster compressor such that the booster compressor is driven by the low-pressure turbine; and
a thrust bearing assembly coupled between said booster and said gearbox and configured to transfer residual thrust loads generated by said booster to a stationary structural component.

9. A turbine engine assembly comprising:
a core gas turbine engine including a high-pressure compressor, a combustor, and a high-pressure turbine;
a low-pressure turbine coupled to said core gas turbine engine;
a booster compressor;
a gearbox coupled between said low-pressure turbine and said booster compressor such that the booster compressor is driven by the low-pressure turbine;
wherein said gearbox has a substantially toroidal cross-sectional profile and substantially circumscribes said drive shaft.

10. A turbine engine assembly comprising:
a core gas turbine engine including a high-pressure compressor, a combustor, and a high-pressure turbine;
a low-pressure turbine coupled to said core gas turbine engine;
a booster compressor;
a gearbox coupled between said low-pressure turbine and said booster compressor such that the booster compressor is driven by the low-pressure turbine; and
a flex connection coupled between said drive shaft and said gearbox.

11. A turbine engine assembly comprising:
a core gas turbine engine including a high-pressure compressor, a combustor, and a high-pressure turbine;
a low-pressure turbine coupled to said core gas turbine engine;
a booster compressor;
a gearbox coupled between said low-pressure turbine and said booster compressor such that the booster compressor is driven by the low-pressure turbine; and
a generator driven by said booster compressor.

12. A turbine engine in accordance with claim 11, further comprising:
a drive shaft coupled to an output of said gearbox;
a first bevel gear coupled to said drive shaft;
a generator drive shaft coupled to said generator; and
a second bevel gear coupled to an end of said generator drive shaft, said second bevel gear configured to mesh with said first bevel gear such that said booster compressor drives said generator.

\* \* \* \* \*